United States Patent
Mueckl et al.

(10) Patent No.: US 12,491,593 B2
(45) Date of Patent: *Dec. 9, 2025

(54) ELECTRONIC SPINDLE LOCK FOR A POWER TOOL

(71) Applicant: MILWAUKEE ELECTRIC TOOL CORPORATION, Brookfield, WI (US)

(72) Inventors: Gareth Mueckl, Milwaukee, WI (US); Zachary G. Stanke, Wausau, WI (US); Jeremy R. Ebner, East Troy, WI (US); Timothy R. Obermann, Waukesha, WI (US); Ryan B. Jipp, Brookfield, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 22 days.

This patent is subject to a terminal disclaimer.

(21) Appl. No.: 18/428,272

(22) Filed: Jan. 31, 2024

(65) Prior Publication Data
US 2024/0173808 A1    May 30, 2024

Related U.S. Application Data

(63) Continuation of application No. 17/176,505, filed on Feb. 16, 2021, now Pat. No. 11,919,117.
(Continued)

(51) Int. Cl.
*B23Q 5/04* (2006.01)
*B23B 31/12* (2006.01)
(Continued)

(52) U.S. Cl.
CPC .............. *B23Q 5/043* (2013.01); *B23B 31/12* (2013.01); *B23Q 3/155* (2013.01); *B25B 23/147* (2013.01);
(Continued)

(58) Field of Classification Search
CPC . B23B 31/12; B23B 2231/06; B23B 2231/38; B23B 2260/128; B23Q 3/155;
(Continued)

(56) References Cited

U.S. PATENT DOCUMENTS 4,229,981 A   10/1980   Macky
4,292,571 A    9/1981   Cuneo
(Continued)

FOREIGN PATENT DOCUMENTS

CN   109496176 A   3/2019
DE    10003773 B4   8/2005
(Continued)

OTHER PUBLICATIONS

Extended European Search Report for Application No. 21757666.9 dated Mar. 14, 2024 (7 pages).
(Continued)

*Primary Examiner* — Robert F Long
*Assistant Examiner* — Eduardo R Ferrero
(74) *Attorney, Agent, or Firm* — Michael Best & Friedrich LLP

(57) ABSTRACT

Electronic spindle lock for a power tool. One embodiment provides a power tool including a housing, a bit receiving portion provided on the housing for receiving a power tool bit, a motor within the housing configured to rotate the bit receiving portion, and a controller coupled to the motor. The controller is configured to enter an electronic spindle lock mode, and detect rotation of the bit receiving portion in a first direction. The controller is also configured to control motor to rotate in a second direction in response to detecting rotation of the bit receiving portion in the first direction.

20 Claims, 13 Drawing Sheets

Related U.S. Application Data

(60) Provisional application No. 62/977,596, filed on Feb. 17, 2020.

(51) Int. Cl.
  *B23Q 3/155* (2006.01)
  *B25B 23/147* (2006.01)
  *B25F 5/00* (2006.01)

(52) U.S. Cl.
  CPC .......... *B25F 5/00* (2013.01); *B23B 2231/06* (2013.01); *B23B 2231/38* (2013.01); *B23B 2260/128* (2013.01); *Y10S 279/90* (2013.01); *Y10T 279/21* (2015.01)

(58) Field of Classification Search
  CPC ......... B23Q 5/043; B25B 23/147; B25F 5/00; Y10S 279/90; Y10T 279/21
  See application file for complete search history.

(56) References Cited

U.S. PATENT DOCUMENTS

| | | | |
|---|---|---|---|
| 4,460,296 | A | 7/1984 | Sivertson, Jr. |
| 4,909,521 | A | 3/1990 | Ovanin |
| 5,191,968 | A | 3/1993 | McCurry |
| 5,322,494 | A | 6/1994 | Holtey et al. |
| 5,382,213 | A | 1/1995 | Kopel et al. |
| 6,814,158 | B2 | 11/2004 | Bieber et al. |
| 7,144,355 | B2 | 12/2006 | Momochi et al. |
| 7,578,357 | B2 | 8/2009 | Schell |
| 7,591,195 | B2 | 9/2009 | Puzio |
| 7,891,918 | B2 | 2/2011 | Mack |
| 8,235,139 | B2 | 8/2012 | Chen et al. |
| 8,851,201 | B2 | 10/2014 | Limberg et al. |
| 9,259,790 | B2 | 2/2016 | Campbell et al. |
| 10,512,971 | B2 | 12/2019 | Zhong et al. |
| 10,953,532 | B2 | 3/2021 | Sunabe et al. |
| 2001/0035292 | A1 | 11/2001 | Bieber et al. |
| 2002/0130007 | A1 | 9/2002 | Nakamura et al. |
| 2005/0000998 | A1 | 1/2005 | Grazioli et al. |
| 2005/0127862 | A1 | 6/2005 | Glasgow et al. |
| 2005/0155227 | A1 | 7/2005 | Botefuhr et al. |
| 2006/0091858 | A1 | 5/2006 | Johnson et al. |
| 2006/0202435 | A1 | 9/2006 | Rohm et al. |
| 2006/0233621 | A1 | 10/2006 | Schell et al. |
| 2006/0243469 | A1 | 11/2006 | Webster |
| 2007/0034394 | A1 | 2/2007 | Gass et al. |
| 2007/0132196 | A1 | 6/2007 | Puzio et al. |
| 2007/0235952 | A1 | 10/2007 | Mack |
| 2008/0021590 | A1 | 1/2008 | Vanko et al. |
| 2011/0214892 | A1 | 9/2011 | Hecht et al. |
| 2012/0000682 | A1 | 1/2012 | Grazioli |
| 2013/0025894 | A1 | 1/2013 | Campbell |
| 2013/0033010 | A1 | 2/2013 | Hiestand |
| 2013/0082631 | A1 | 4/2013 | Suzuki et al. |
| 2013/0193891 | A1 | 8/2013 | Wood et al. |
| 2013/0277923 | A1 | 10/2013 | Campbell et al. |
| 2013/0287508 | A1 | 10/2013 | Timmons et al. |
| 2014/0049011 | A1 | 2/2014 | Mikoleizig |
| 2014/0166324 | A1 | 6/2014 | Puzio et al. |
| 2014/0202725 | A1 | 7/2014 | Johnson |
| 2015/0225905 | A1 | 8/2015 | Gareis et al. |
| 2015/0280424 | A1 | 10/2015 | Leimbach et al. |
| 2016/0114408 | A1 | 4/2016 | Campbell et al. |
| 2016/0199920 | A1 | 7/2016 | Schubert |
| 2019/0168362 | A1 | 6/2019 | Klotblixt |
| 2019/0207539 | A1 | 7/2019 | Westerby et al. |
| 2020/0086396 | A1 | 3/2020 | Stanton et al. |
| 2021/0205976 | A1 | 7/2021 | Matei |

FOREIGN PATENT DOCUMENTS

| | | | | |
|---|---|---|---|---|
| JP | 2013146857 | A | | 8/2013 |
| JP | 2014069253 | A | | 4/2014 |
| JP | 2014104536 | A | * | 6/2014 |
| JP | 2019004614 | A | * | 1/2019 ........... B24B 23/028 |
| JP | 2019063923 | A | * | 4/2019 |
| JP | 6508412 | B2 | | 5/2019 |
| KR | 20160126796 | A | * | 4/2015 |
| KR | 1020160126796 | A | | 11/2016 |
| WO | 2008085029 | A1 | | 7/2008 |
| WO | 2008153195 | A1 | | 12/2008 |
| WO | 2017063851 | A1 | | 4/2017 |
| WO | 2019193979 | A1 | | 10/2019 |
| WO | 2020003696 | A1 | | 1/2020 |

OTHER PUBLICATIONS

Japanese Patent Office Action for Application No. 2022-549400 dated Jun. 4, 2024 (7 pages including machine English translation).

International Search Report and Written Opinion for Application No. PCT/US2021/018166 dated Jun. 4, 2021 (11 pages).

Japanese Patent Office Action for Application No. 2022-549400 dated Nov. 28, 2023 (6 pages including machine English translation).

\* cited by examiner

ELECTRONIC SPINDLE LOCK FOR A POWER TOOL

RELATED APPLICATIONS

This application is a continuation of U.S. patent application Ser. No. 17/176,505, filed Feb. 16, 2021, which claims the benefit of priority to U.S. Provisional Patent Application No. 62/977,596, filed on Feb. 17, 2020, the entire content of each of which is hereby incorporated by reference.

BACKGROUND

Conventional power tools include a chuck that receives tool bits of the power tool. The chuck includes chuck jaws to hold the tool bit. To receive the tool bit, the chuck is manually rotated by the user to loosen the chuck jaws. After placing the tool bit between the chuck jaws, the chuck is rotated again to tighten the chuck jaws around the tool bit.

SUMMARY

A mechanical spindle lock is conventionally provided to resist or inhibit rotation of a power tool drivetrain when the user manually applies torque to the chuck for tightening or loosening the chuck jaws. The mechanical spindle lock is a mechanical component that is added between the power tool drivetrain and the chuck. As a consequence, the mechanical spindle lock adds length, cost, and complexity to the overall design of the power tool.

Embodiments described herein provide a spindle locking technique that reduces the length, cost and complexity of the overall design of the power tool.

Power tools described herein include a housing, a bit receiving portion provided on the housing, a motor within the housing configured to rotate the bit receiving portion, and a controller coupled to the motor. The controller is configured to enter an electronic spindle lock mode, and activate a spindle lock control loop in response to entering the electronic spindle lock mode. The spindle lock control loop includes detecting rotation of the bit receiving portion in a first direction, and controlling the motor to rotate in a second direction in response to detecting rotation of the bit receiving portion in the first direction.

In some aspects, the power tools further include a trigger, wherein the controller is further configured to enter the electronic spindle lock mode when the trigger is released for stopping operation of the power tool.

In some aspects, the controller is further configured to determine that the power tool is stopped, activate the spindle lock control loop in response to determining that the power tool is stopped, detect, using one or more sensors, movement of the power tool a delay time after activating the spindle lock control loop, and enter a sleep mode when no movement of the power tool is detected after the delay time.

In some aspects, the one or more sensors includes at least one selected from the group consisting of an accelerometer, a capacitive sensor, and an inductive sensor.

In some aspects, the spindle lock control loop is deactivated in the sleep mode.

In some aspects, the controller is further configured to determine that a wake-up signal is received when in the sleep mode, perform normal motor operation when the wake-up signal is received from a trigger, and activate the spindle lock control loop when the wake-up signal is received from the one or more sensors.

In some aspects, normal motor operation includes controlling the motor according to trigger pull of a trigger.

In some aspects, the power tools further include an electronic spindle lock button, wherein the controller is further configured to enter the electronic spindle lock mode when the electronic spindle lock button is actuated.

In some aspects, the rotation of the bit receiving portion in the first direction is detected based on sensing a parameter indicating rotation of the bit receiving portion.

In some aspects, the parameter is a rotor position.

In some aspects, the motor is rotated in the second direction to maintain a static rotation position.

In some aspects, the controller is further configured to enforce a maximum time limit for the electronic spindle lock mode such that the spindle lock control loop is deactivated after the maximum time limit.

In some aspects, the electronic processor is further configured to detect an impulse when in the electronic spindle lock mode, and disable the spindle lock control loop in response to detecting the impulse.

In some aspects, the power tools further include a battery pack providing operating power to the motor.

In some aspects, the electronic processor is further configured to detect a voltage level of the battery pack, and disable the spindle lock control loop in response to the voltage level being below a predetermined low-voltage threshold.

Power tools described herein include a housing, a bit receiving portion provided on the housing, a motor within the housing configured to rotate the bit receiving portion, and a controller coupled to the motor. The controller is configured to enter an electronic spindle lock mode, and control the motor as a brake in response to entering the spindle lock mode. The motor generates a counter torque in response to a torque applied to the bit receiving portion.

In some aspects, the power tools further include a trigger, wherein the controller is further configured to enter the electronic spindle lock mode when the trigger is released for stopping operation of the power tool.

In some aspects, the power tools further include an electronic spindle lock button, wherein the controller is further configured to enter the electronic spindle lock mode when the electronic spindle lock button is actuated.

In some aspects, the control of the motor as a brake includes shorting motor windings of the motor.

In some aspects, the power tools further include a metal-oxide-semiconductor field effect transistor (MOSFET) connected between the motor windings.

In some aspects, the power tools further include a battery pack providing operating power to the motor, wherein the MOSFET is a depletion mode MOSFET, wherein the depletion mode MOSFET is normally closed when the battery pack is removed, and wherein the controller is further configured to open the depletion mode MOSFET when the battery pack is connected to the power tool.

In some aspects, the power tools further include a battery pack providing operating power to the motor, wherein the motor further includes secondary windings configured to develop a voltage when the bit receiving portion is rotated relative to the housing and the battery pack is disconnected from the power tool.

In some aspects, the voltage on the secondary windings is used to charge a capacitor, and wherein when the capacitor is sufficiently charged, the capacitor is used to short motor windings of the motor.

Methods described herein for operating an electronic spindle lock of a power tool include entering, using a controller of the power tool, an electronic spindle lock mode, and activating, using the controller, a spindle lock control loop in response to entering the electronic spindle lock mode. The spindle lock control loop includes detecting rotation of a bit receiving portion of the power tool in a first direction, and controlling a motor of the power tool to rotate in a second direction in response to detecting rotation of the bit receiving portion in the first direction.

In some aspects, the methods further include detecting, using the controller, release of a trigger of the power tool for stopping the power tool, and entering the electronic spindle lock mode when the trigger is released.

In some aspects, the methods further include determining that the power tool is stopped, activating the spindle lock control loop in response to determining that the power tool is stopped, detecting, using one or more sensors, movement of the power tool a delay time after activating the spindle lock control loop, and entering a sleep mode when no movement of the power tool is detected after the delay time.

In some aspects, the one or more sensors includes at least one selected from the group consisting of an accelerometer, a capacitive sensor, and an inductive sensor.

In some aspects, the methods further include deactivating the spindle lock control loop in the sleep mode.

In some aspects, the methods further include determining that a wake-up signal is received when in the sleep mode, performing normal motor operation when the wake-up signal is received from a trigger, and activating the spindle lock control loop when the wake-up signal is received from the one or more sensors.

In some aspects, the normal motor operation includes controlling the motor according to trigger pull of the trigger.

In some aspects, the methods further include detecting actuation of an electronic spindle lock button, and entering the electronic spindle lock mode when the electronic spindle lock button is actuated.

In some aspects, the methods further include the rotation of the bit receiving portion in the first direction is detected based on sensing a parameter indicating rotation of the bit receiving portion.

In some aspects, the parameter is a rotor position.

In some aspects, the motor is rotated in the second direction to maintain a static rotation position.

In some aspects, the methods further include enforcing a maximum time limit for the electronic spindle lock mode such that the spindle lock control loop is deactivated after the maximum time limit.

In some aspects, the methods further include detecting an impulse when in the electronic spindle lock mode, and disabling the spindle lock control loop in response to detecting the impulse.

In some aspects, the methods further include detecting a voltage level of a battery pack providing operating power to the motor, and disabling the spindle lock control loop in response the voltage level being below a predetermined low-voltage threshold.

Methods described herein for operating an electronic spindle lock of a power tool include entering, using a controller of the power tool, an electronic spindle lock mode, and controlling, using the controller, a motor of the power tool as a brake in response to entering the spindle lock mode, wherein the motor generates a counter torque in response to a torque applied to the bit receiving portion.

In some aspects, the methods further include detecting, using the controller, release of a trigger of the power tool for stopping the power tool, and entering the electronic spindle lock mode when the trigger is released.

In some aspects, the methods further include detecting actuation of an electronic spindle lock button, and entering the electronic spindle lock mode when the electronic spindle lock button is actuated.

In some aspects, the controlling the motor as a brake includes shorting motor windings of the motor.

In some aspects, the methods further include connecting a metal-oxide-semiconductor field effect transistor (MOSFET) between the motor windings.

In some aspects, the MOSFET is a depletion mode MOSFET, the depletion mode MOSFET is normally closed when a battery pack of the power tool is removed, and the methods further include opening the depletion mode MOSFET when the battery pack is connected to the power tool.

In some aspects, the methods further include developing a voltage on a secondary winding of the motor when the bit receiving portion is rotated relative to a housing of the power tool and when a battery pack of the power tool is disconnected from the power tool.

In some aspects, the methods further include charging a capacitor using the voltage on the secondary windings, and shorting motor windings of the motor when then capacitor is sufficiently charged.

Power tools described herein include a housing, a bit receiving portion provided on the housing for receiving a power tool bit, a motor within the housing configured to rotate the bit receiving portion, and a controller coupled to the motor. The controller is configured to enter an electronic spindle lock mode, and detect rotation of the bit receiving portion in a first direction. The controller is also configured to control motor to rotate in a second direction in response to detecting rotation of the bit receiving portion in the first direction.

Methods described herein provide for operating an electronic spindle lock of a power tool. The methods include entering, using a controller of the power tool, an electronic spindle lock mode, and detecting rotation of a bit receiving portion of the power tool in a first direction. The methods also include controlling, using the controller, a motor of the power tool to rotate in a second direction in response to detecting rotation of the bit receiving portion in the first direction.

Methods described herein provide for operating an electronic spindle lock of a power tool. The methods include entering, using a controller of the power tool, an electronic spindle lock mode, and configuring a motor of the power tool as a brake in response to entering the electronic spindle lock mode. The methods also include generating, using the motor, a counter torque in response to a torque applied to the bit receiving portion.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software based devices, as well as a plurality of different structural components, may be utilized to implement the embodiments. For example, "servers" and "computing devices" described in the specification can include one or more processing units, one or more computer-readable medium modules, one or more input/output interfaces, and various connections (e.g., a system bus) connecting the components.

Other aspects of the embodiments will become apparent by consideration of the detailed description and accompanying drawings.

DETAILED DESCRIPTION

Embodiments described herein relate to an electronic spindle lock implemented by control of a power tool motor to resist or inhibit movement of the power tool's drive train when the bit receiving portion is rotated.

Figure 1:
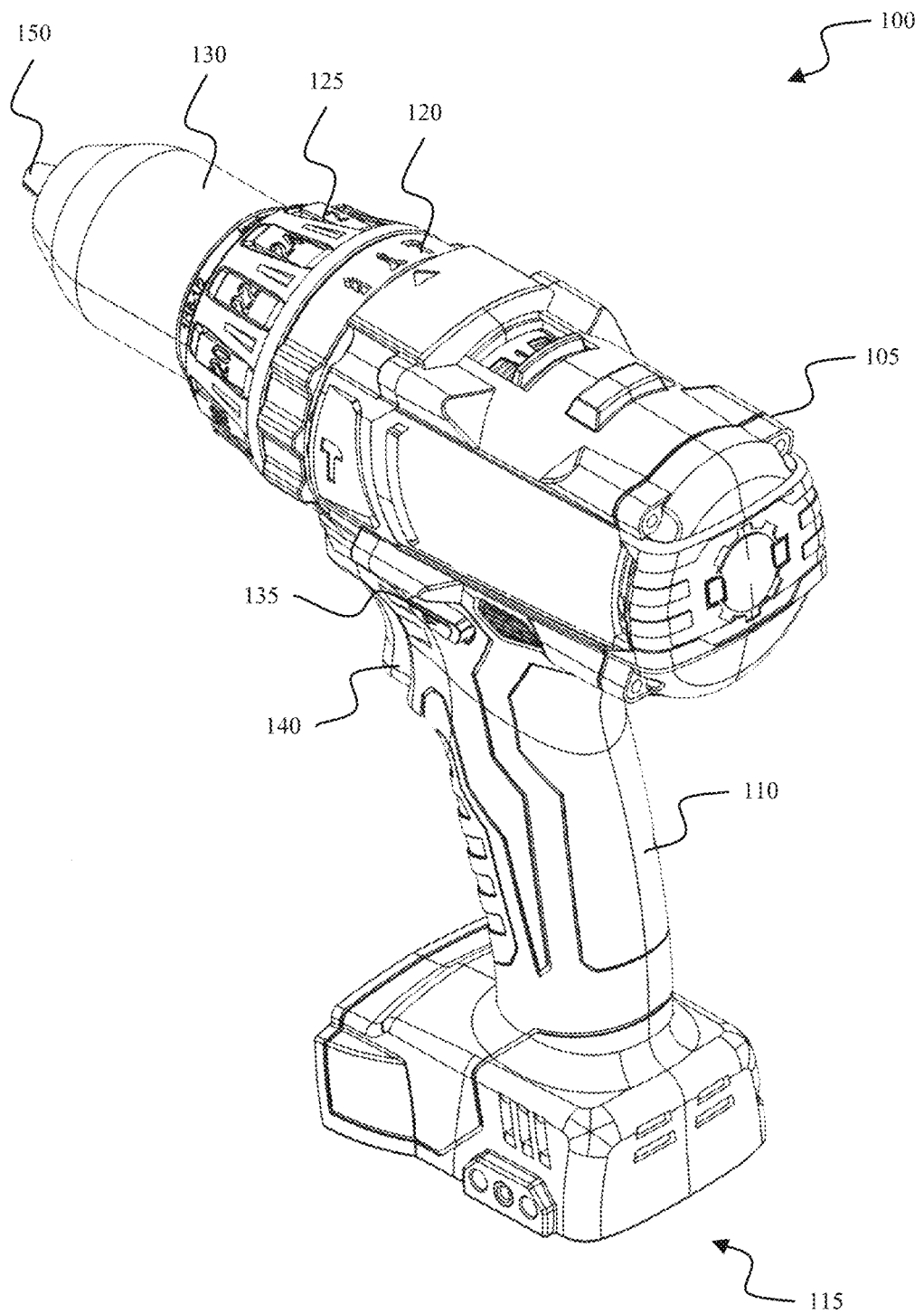
FIG. 1 illustrates a hand-held power tool in accordance with some embodiments.

The cordless, hand-held power tool illustrated in FIG. 1 is a hammer drill/driver ("hammer drill") 100. The hammer drill 100 includes an upper main body 105, a handle portion 110, a battery pack receiving portion 115, a mode selection portion 120 (for example, for selecting among a drilling mode, a driving mode, a hammer mode, etc.), a torque adjustment dial or ring 125, an output drive device or mechanism (for example, a chuck) 130, a forward, reverse selection button 135, and a trigger 140. The battery pack receiving portion 115 receives a battery pack (for example, battery pack 400 of FIG. 4). The chuck 130 receives one of a plurality of tool bits used for drilling and driving operations by the hammer drill 100. The chuck 130 includes chuck jaws 150 that open and close (for example, loosen and tighten) to receive and release the tool bit. To open the chuck jaws 150, the user manually rotates the chuck 130 in a first or counterclockwise direction. To close the chuck jaws 150, the user manually rotates the chuck 130 in a second or clockwise direction. Conventional hammer drills include a mechanical spindle lock provided between the chuck 130 and the power tool drive train to resist or inhibit rotation of the drivetrain when the user manually rotates the chuck 130. In the present hammer drill 100, the mechanical spindle lock may be removed.

Figure 2A:
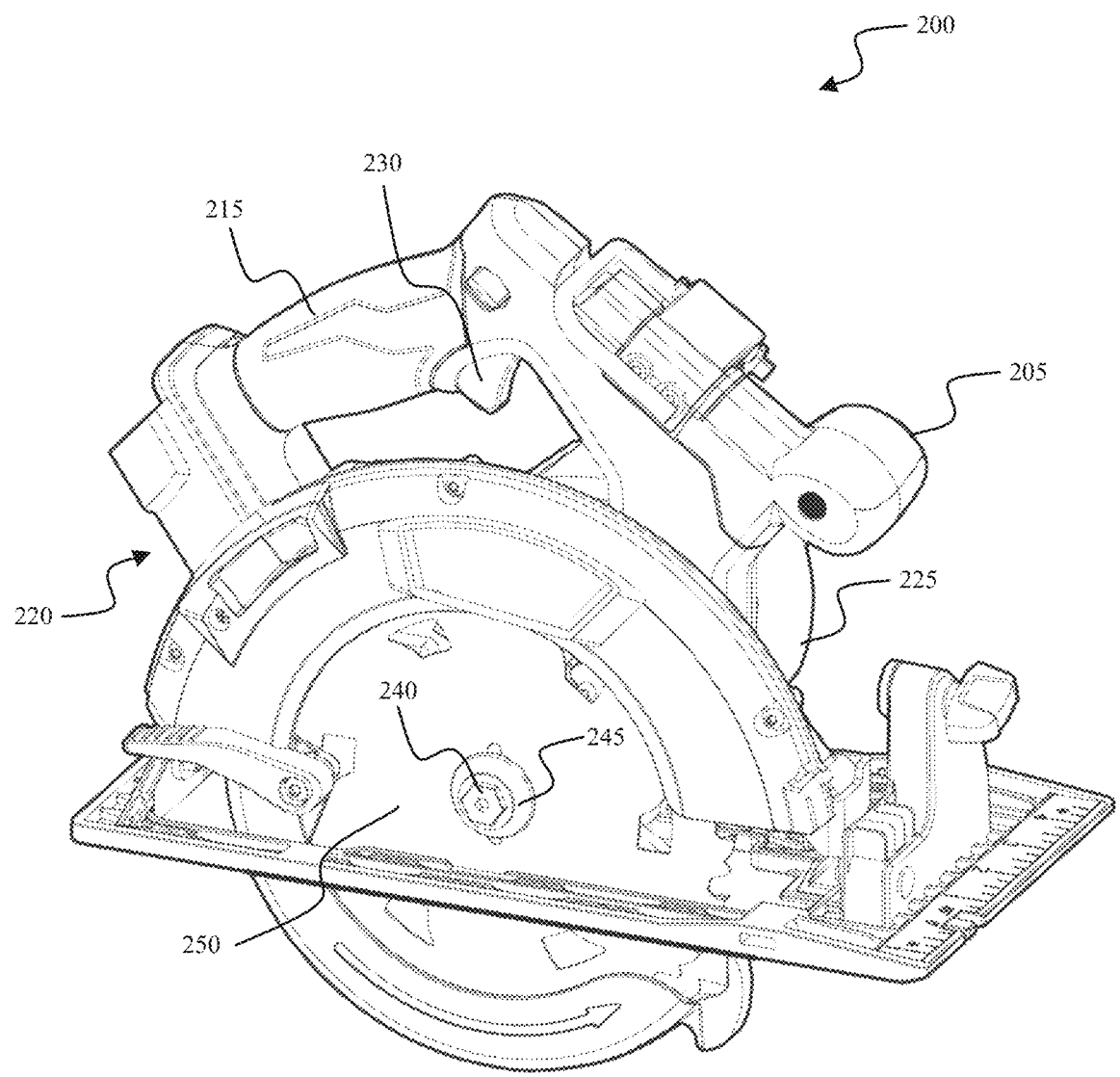
FIGS. 2A and 2B illustrate a hand-held power tool in accordance with some embodiments.
Figure 2B:
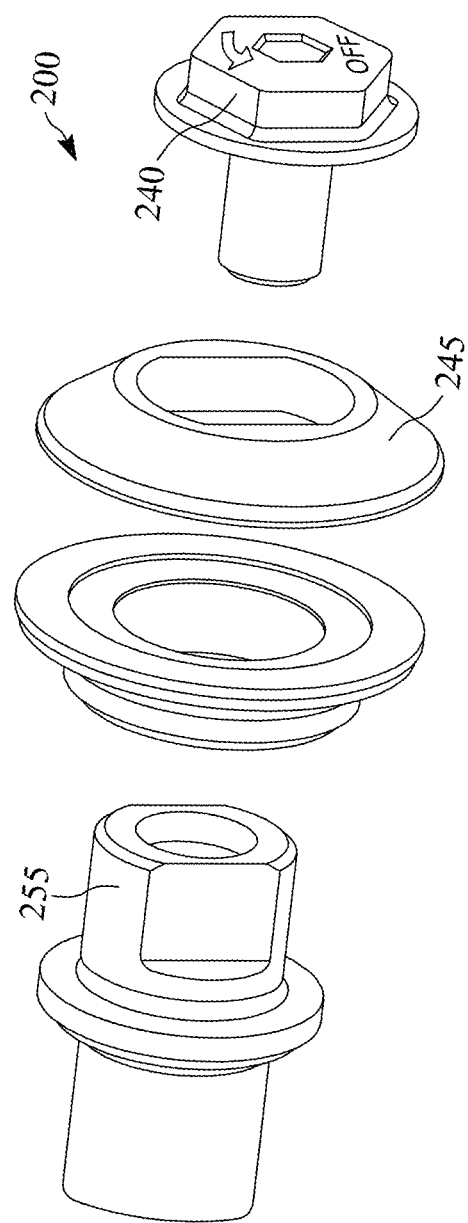

The cordless, hand-held power tool illustrated in FIGS. 2A and 2B is a saw (e.g., a circular saw) 200. The circular saw 200 includes a saw main body 205, a handle portion 215, a battery pack receiving portion 220, a spindle lock button 225, a trigger 230, a blade bolt 240, a blade flange 245, and a blade accessory 250. The battery pack receiving portion 220 receives a battery pack (for example, battery pack 400 of FIG. 4). As shown in FIG. 2B, the blade accessory 250 is provided between the blade flange 245 and a spindle 255. The blade bolt 240 secures the blade flange 245 and the blade accessory 250 to the spindle 255. The spindle 255 is rotated by the motor of the circular saw 200 to rotate the blade accessory 250 for a cutting operation. To remove the blade accessory 250, a user pushes the spindle lock button 225 and, while holding the spindle lock button 225, uses a wrench provided with the circular saw 200 to manually rotate the blade bolt 240 in a counterclockwise direction. To install the blade accessory 250, the user places the blade accessory 250 on the spindle 255 and uses the wrench to manually rotate the blade bolt 240 in a clockwise direction while holding the spindle lock button 225. The spindle lock button 225 activates a mechanical spindle lock mechanism (not shown) to resist or inhibit rotation of the spindle 255 when the user manually tightens or loosens the blade bolt 240. In the present circular saw 200, the mechanical spindle lock mechanism may be removed.

Figure 3A:
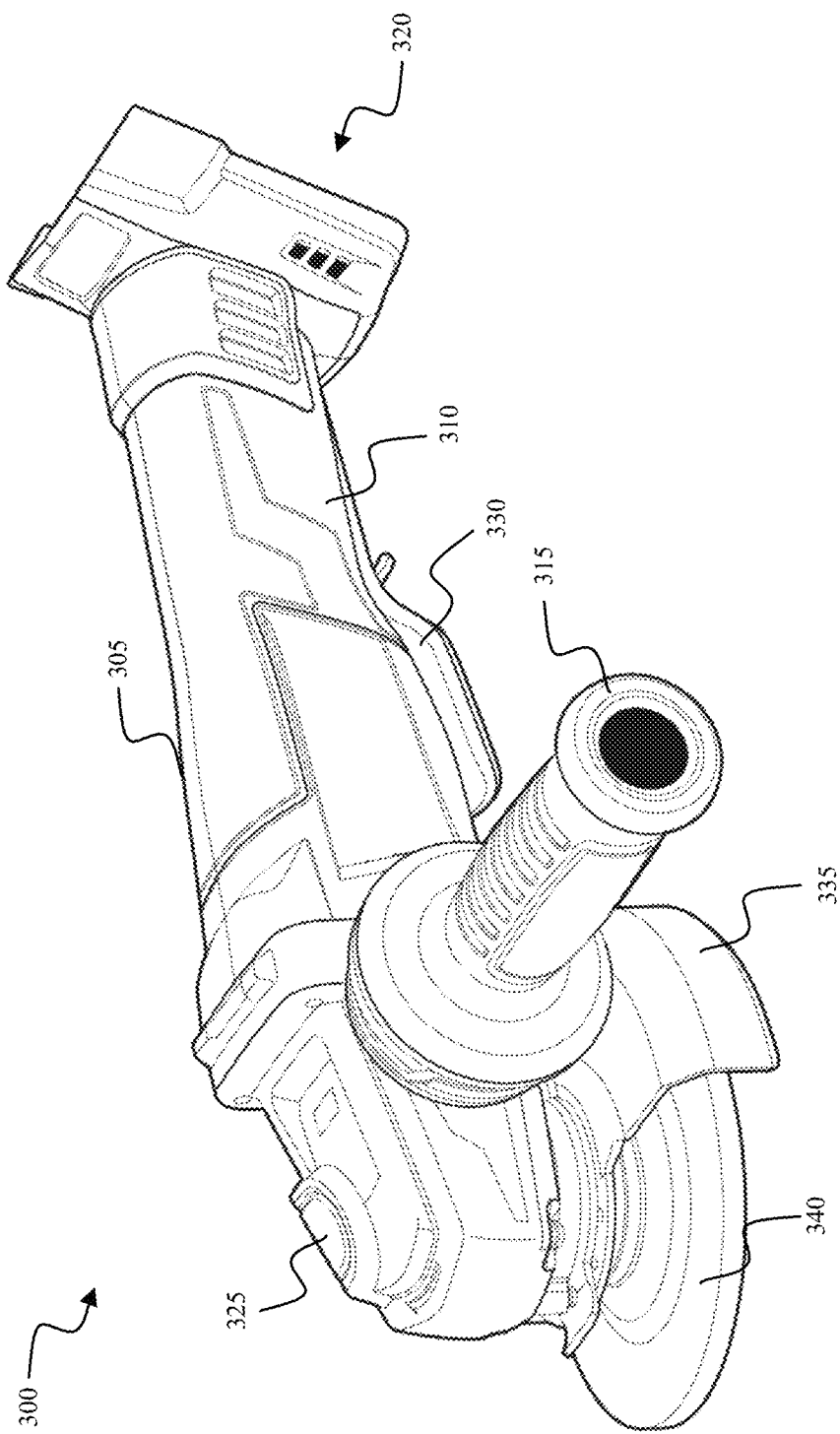
FIGS. 3A and 3B illustrate a hand-held power tool in accordance with some embodiments.
Figure 3B:
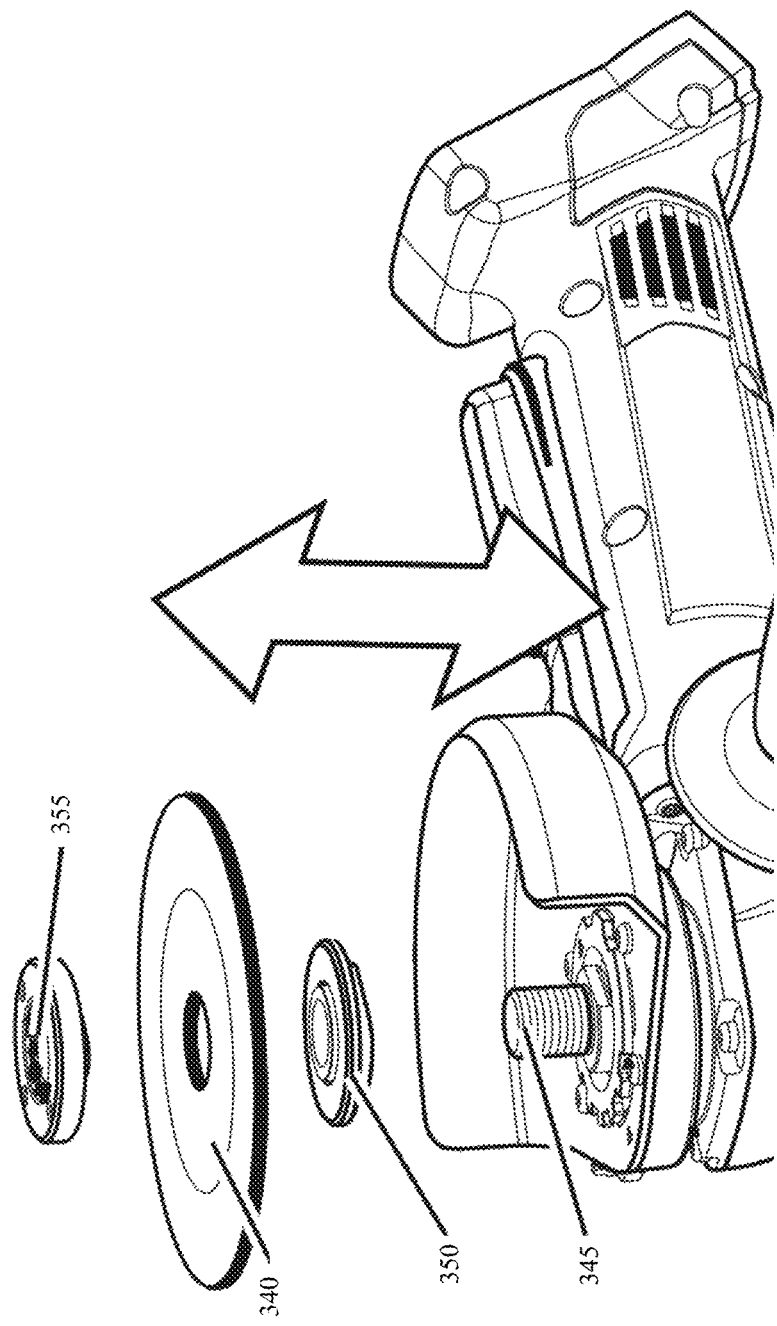

The cordless, hand-held power tool illustrated in FIG. 3 is a grinder 300. The grinder 300 includes a grinder main body 305, a handle portion 310, a side handle 315, a battery pack receiving portion 320, a spindle lock button 325, a trigger 330, a guard 335, and a grinder accessory (for example, a grinding wheel, a sanding disc, and the like) 340. The battery pack receiving portion 320 receives a battery pack (for example, battery pack 400 of FIG. 4). As shown in FIG. 3B, the grinder accessory 340 is provided on a spindle 345 between a flange 350 and a flange nut 355. The flange nut 355 secures the grinder accessory 340 to the spindle 345. The spindle 345 is rotated by the motor of the grinder 300 to rotate the grinder accessory 340 for a grinding or sanding operation. To remove the grinder accessory 340, the user pushes the spindle lock button 325 and while holding the spindle lock button 325, manually rotates the flange nut 355 in a counterclockwise direction. To install the grinder accessory 340, the user places the grinder accessory 340 on the spindle 345 and manually rotates the flange nut 355 in a clockwise direction while holding the spindle lock button 325. The spindle lock button 325 activates a mechanical spindle lock mechanism (not shown) to resist or inhibit rotation of the spindle when the user manually tightens or loosens the flange nut 355. In the present grinder 300, the mechanical spindle lock mechanism may be removed.

Figure 4:
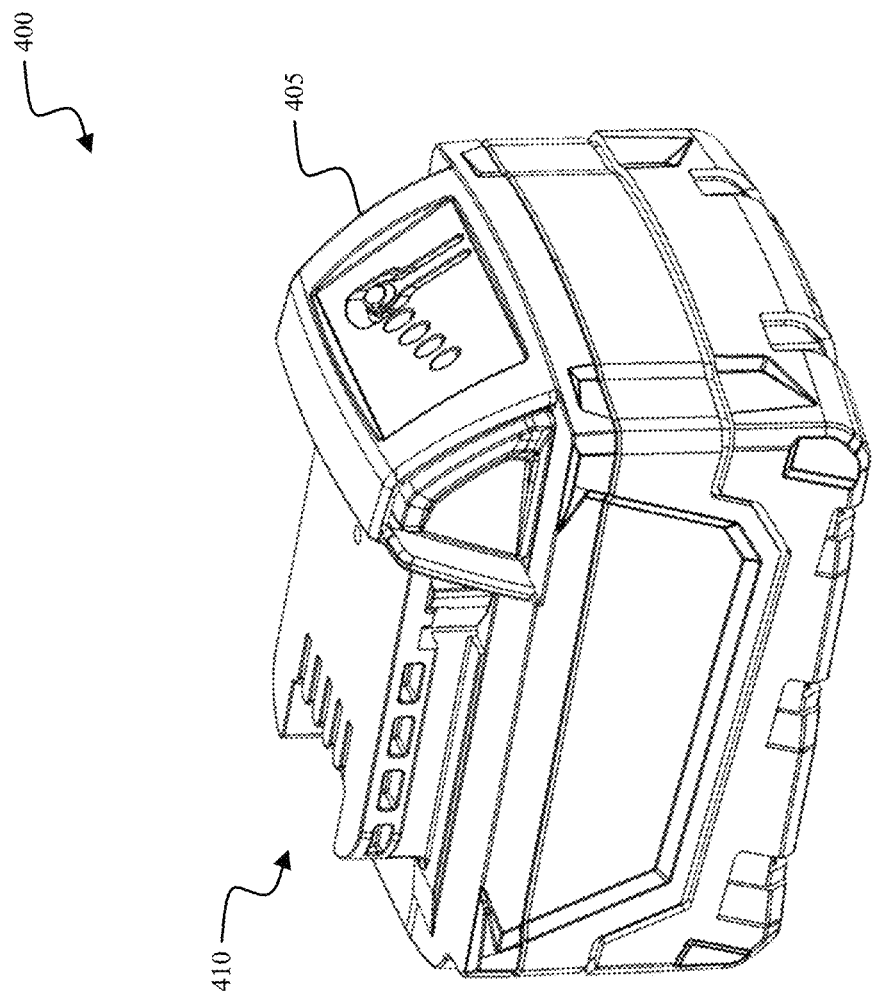
FIG. 4 illustrates a battery pack that powers the power tools of FIGS. 1-3 in accordance with some embodiments.

FIG. 4 illustrates a battery pack 400 including a housing 405 and an interface portion 410 for connecting the battery pack 400 to a device (e.g., a power tool 100, 200, 300). In some embodiments, the battery pack 400 has a nominal voltage of about 18 Volts (V) with a maximum voltage of about 20 V. In other embodiments, the battery pack 400 may have other nominal and maximum voltages (for example, 12V-14.4 V, 36V-40V, and the like). The same battery pack 400 may be used to power each of the power tool devices 100, 200, 300. As a consequence, a single battery pack 400 powers a whole system of power tools allowing for compatibility between different power tools 100, 200, 300.

Figure 5:
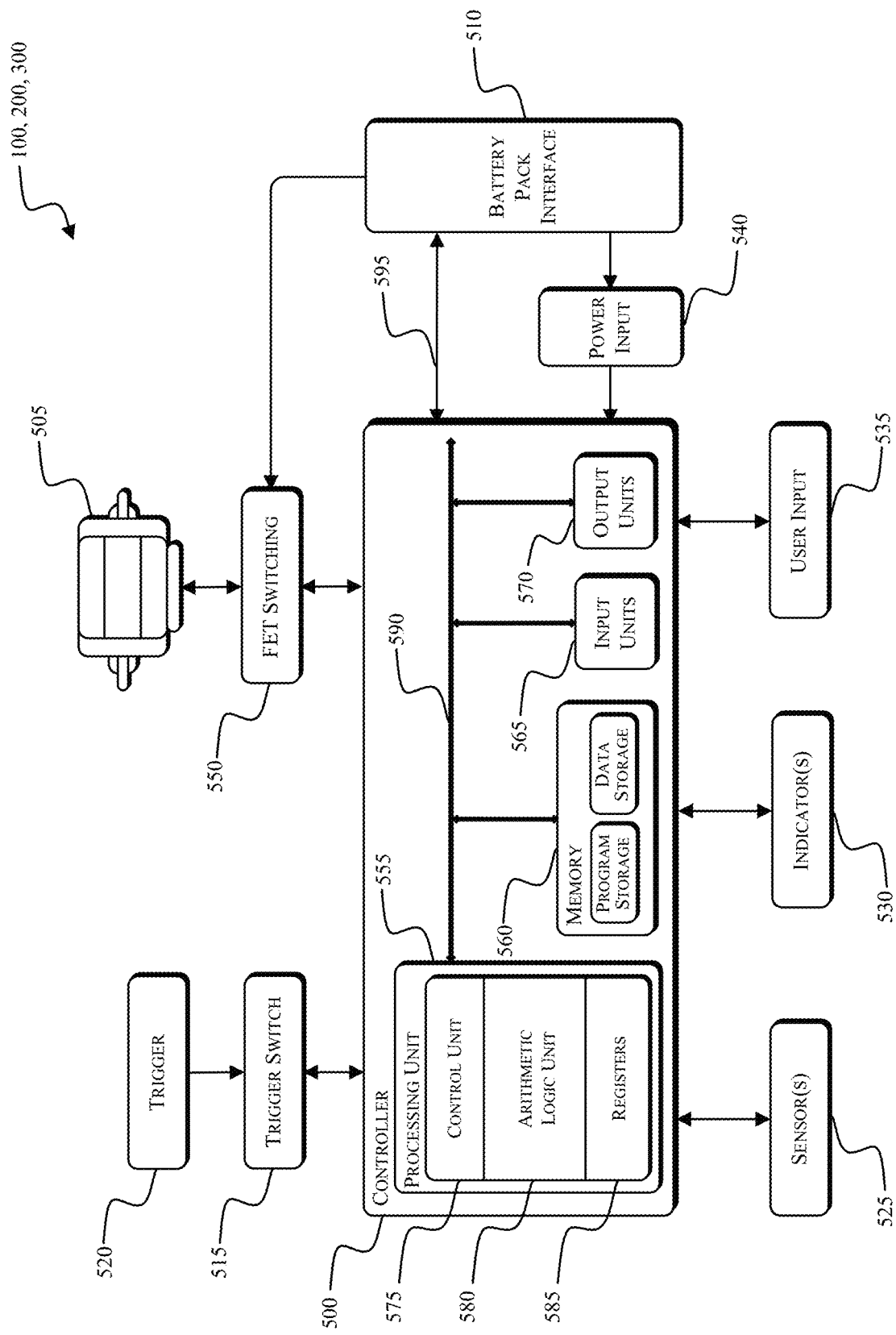
FIG. 5 illustrates a control system for a power tool in accordance with some embodiments.

FIG. 5 illustrates a control system for the power tool 100, 200, 300. The control system includes a controller 500. The controller 500 is electrically and/or communicatively connected to a variety of modules or components of the power tool 100, 200, 300. For example, the illustrated controller 500 is electrically connected to a motor 505, a battery pack interface 510, a trigger switch 515 (connected to a trigger 520), one or more sensors or sensing circuits 525, one or more indicators 530, a user input module 535, a power input module 540, and a FET switching module 550 (e.g., including a plurality of switching FETs). The controller 500 includes combinations of hardware and software that are operable to, among other things, control the operation of the power tool 100, 200, 300, monitor the operation of the power tool 100, 200, 300, activate the one or more indicators 530 (e.g., an LED), etc.

The controller 500 includes a plurality of electrical and electronic components that provide power, operational control, and protection to the components and modules within the controller 500 and/or the power tool 100, 200, 300. For example, the controller 500 includes, among other things, a processing unit 555 (e.g., a microprocessor, a microcontroller, an electronic processor, an electronic controller, or another suitable programmable device), a memory 560, input units 565, and output units 570. The processing unit 555 includes, among other things, a control unit 575, an ALU 580, and a plurality of registers 585 (shown as a group of registers in FIG. 5), and is implemented using a known computer architecture (e.g., a modified Harvard architecture, a von Neumann architecture, etc.). The processing unit 555, the memory 560, the input units 565, and the output units 570, as well as the various modules or circuits connected to the controller 500 are connected by one or more control and/or data buses (e.g., common bus 590). The control and/or data buses are shown generally in FIG. 5 for illustrative purposes. The use of one or more control and/or data buses for the interconnection between and communication among the various modules, circuits, and components would be known to a person skilled in the art in view of the embodiments described herein. In some embodiments, the controller 500 is implemented partially or entirely on a field-programmable gate array (FPGA), an application specific integrated circuit (ASIC), or the like.

The memory 560 is a non-transitory computer readable medium and includes, for example, a program storage area and a data storage area. The program storage area and the data storage area can include combinations of different types of memory, such as a ROM, a RAM (e.g., DRAM, SDRAM, etc.), EEPROM, flash memory, a hard disk, an SD card, or other suitable magnetic, optical, physical, or electronic memory devices. The processing unit 555 is connected to the memory 560 and executes software instructions that are capable of being stored in a RAM of the memory 560 (e.g., during execution), a ROM of the memory 560 (e.g., on a generally permanent basis), or another non-transitory computer readable medium such as another memory or a disc. Software included in the implementation of the power tool 100, 200, 300 can be stored in the memory 560 of the controller 500. The software includes, for example, firmware, one or more applications, program data, filters, rules, one or more program modules, and other executable instructions. The controller 500 is configured to retrieve from the memory 560 and execute, among other things, instructions related to the control processes and methods described herein. In other constructions, the controller 500 includes additional, fewer, or different components.

The battery pack interface 510 includes a combination of mechanical components (e.g., rails, grooves, latches, etc.) and electrical components (e.g., one or more terminals) configured to and operable for interfacing (e.g., mechanically, electrically, and communicatively connecting) the power tool 100, 200, 300 with a battery pack (e.g., the battery pack 400). For example, power provided by the battery pack 400 to the power tool 100, 200, 300 is provided through the battery pack interface 510 to the power input module 540. The power input module 540 includes combinations of active and passive components to regulate or control the power received from the battery pack 400 prior to power being provided to the controller 500. The battery pack interface 510 also supplies power to the FET switching module 550 to be switched by the switching FETs to selectively provide power to the motor 505. The battery pack interface 510 also includes, for example, a communication line 595 for providing a communication line or link between the controller 500 and the battery pack 400.

The indicators 530 include, for example, one or more light-emitting diodes ("LEDs"). The indicators 530 can be configured to display conditions of, or information associated with, the power tool 100, 200, 300. For example, the indicators 530 are configured to indicate measured electrical characteristics of the power tool 100, 200, 300, the status of the device, etc. The user input module 535 is operably coupled to the controller 500 to, for example, select a forward mode of operation or a reverse mode of operation, a torque and/or speed setting for the power tool 100, 200, 300 (e.g., using torque and/or speed switches), etc. In some embodiments, the user input module 535 includes a combination of digital and analog input or output devices required to achieve a desired level of operation for the power tool 100, 200, 300, such as one or more knobs, one or more dials, one or more switches, one or more buttons, etc.

The motor 505 is, for example, a brushless direct current (BLDC) motor. Operating power to the motor 505 is provided through the FET switching module 550. The controller 500 controls the FET switching module 550 to control the amount of power delivered to the motor 505 to rotate the motor based on one or more inputs received by the controller 500. For example, the controller 500 receives an amount of trigger pull from the trigger 520 and a rotor position from Hall-effect sensors of the motor 505 to control the activation and pulse-width modulated (PWM) duty ratio of the FETS of the FET switching module 550. The PWM duty ratio may be controlled in proportion to the amount of trigger pull to provide a variety of operating speeds of the motor 505 based on the trigger pull.

The trigger switch 515 is coupled to the trigger 520 (for example, the trigger 140, 230, 330) for controlling the power provided to the motor 505 through the FET switching module 550. In some embodiments, the amount of trigger pull detected by the trigger switch 515 is related to or corresponds to a desired speed of rotation of the motor 505. In other embodiments, the amount of trigger pull detected by the trigger switch 515 is related to or corresponds to a desired torque.

As discussed above, a mechanical spindle lock mechanism is used in conventional power tools to resist or inhibit rotation of the drivetrain (for example, the spindle 255, 345) when a bit receiving portion (for example, the chuck 130, the blade bolt 240, and the flange nut 355) is manually rotated by the user. However, the mechanical spindle lock mechanism adds to the form factor, the cost, and the complexity of the power tool 100, 200, 300. Embodiments of the power tool 100, 200, 300 eliminate the need for a mechanical spindle lock. Instead, the power tool 100, 200, 300 implements an electronic spindle lock by controlling the motor 505 to resist or inhibit movement of the drive train when the bit receiving portion is rotated.

Figure 6:
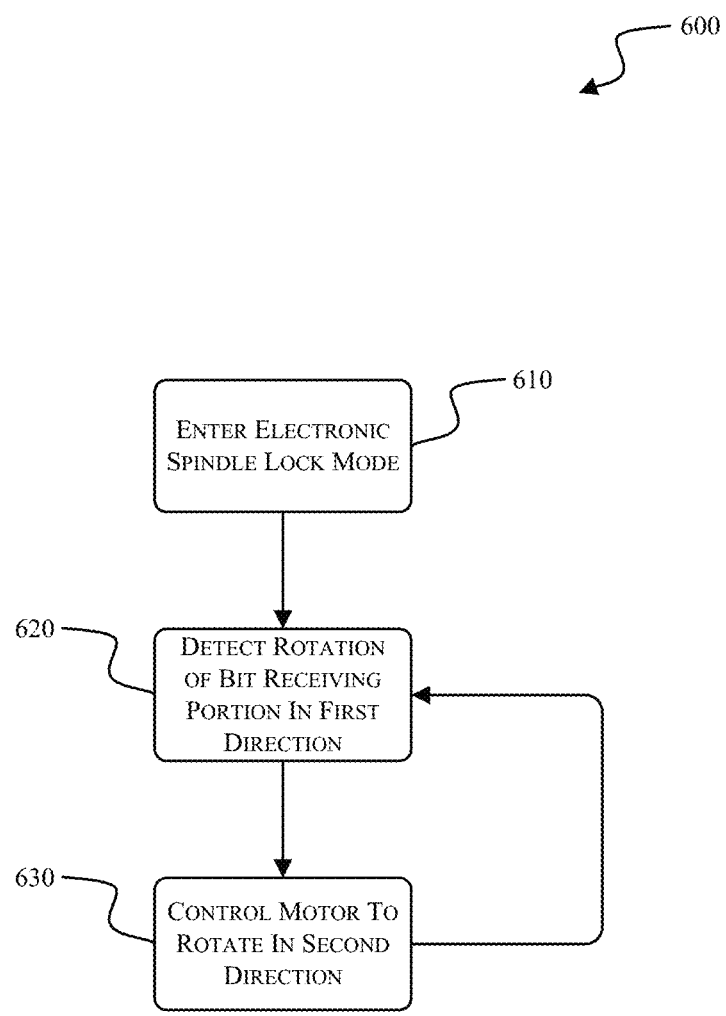
FIG. 6 is a flowchart of a method for operating an electronic spindle lock in accordance with some embodiments.

FIG. 6 is a flowchart of an example method 600 for operating an electronic spindle lock for the power tool 100, 200, 300. In the example illustrated, the method 600 includes entering an electronic spindle lock mode (at block 610). In some embodiments, the electronic spindle lock mode may be entered automatically by the controller 500. For example, the power tool 100 enters an electronic spindle lock mode when the trigger is released for stopping operation of the power tool 100. The controller 500 detects that the trigger is released and enters the electronic spindle lock mode. In other embodiments, the electronic spindle lock mode is entered manually, for example, based on a user input. For example, the power tool 200, 300 may enter the electronic spindle lock mode when the spindle lock button 225, 325 is actuated by the user. In one example, the electronic spindle lock mode is activated only while the spindle lock button 225, 325 is actuated. In other examples, the power tool 200, 300 toggles between the electronic spindle lock mode and a normal mode (e.g., a mode in which the spindle is not locked and the motor rotates with the tool bit) when the user actuates the spindle lock button 225, 325. In some examples, the spindle lock button 225, 325 may be two-position switch that allows a user to select between the electronic spindle lock mode and the normal mode based on the position of the spindle lock button 225, 325.

The method 600 also includes detecting, using a sensor 525, rotation of a bit receiving portion (e.g., the chuck 130, the blade bolt 240, or the flange nut 355) in a first direction (at block 620). Detecting rotation of the bit receiving portion includes, for example, detecting rotation of the bit receiving portion relative to the housing of the power tool 100, 200, 300. The rotation may be detected based on sensing a parameter indicating rotation of the bit receiving portion. In some embodiments, the parameter is rotor position of the motor 505. Rotation of the bit receiving portion may induce a rotation of the rotor of the motor 505. This rotation of the rotor may be used to detect that the bit receiving portion is being rotated in a first direction (for example, a counterclockwise direction or a clockwise direction). In a sensored brushless motor (e.g., including Hall-effect sensors to detect rotor position), the Hall-effect sensor may be used to monitor for rotation of the bit receiving portion. In a sensorless brushless motor (e.g., not including the Hall-effect sensors), a voltage induced in one or more of the coils of the motor 505 may be used to monitor for rotation of the bit receiving portion. In other embodiments, the parameter is spindle position. A Hall-effect sensor or rotary encoders may be provided with the spindle 255, 345 to detect a rotation of the spindle. In some embodiments, the parameter may be a torque induced on the spindle 255, 345 or the motor 505. The torque may be measured using, for example, a torque transducer of the power tool 100, 200, 300.

The method 600 further includes controlling, using the controller 500, the motor 505 to rotate in a second direction in response to detecting rotation of the bit receiving portion in the first direction (at block 620). The second direction is opposite of the first direction. For example, when the bit receiving portion is rotated in the counterclockwise direction, the motor is rotated in the clockwise direction and vice versa. The controller 500 controls rotation of the motor 505 to counter the rotation of the bit receiving portion. The motor 505 is controlled to maintain a static rotational position (i.e., 0 RPM). As described above, the controller 500 may provide PWM signals to the FET switching module 550 to control rotation of the motor 505. The controller 500 receives feedback from the rotational position sensor (e.g., Hall-effect sensor in sensored motor and voltage sensor in sensorless motor) and uses the feedback from the rotational position sensor to maintain the rotational position of the motor 505.

The method 600 and specifically blocks 610 and 620 are repeated to maintain the rotational position of the motor 505. The method 600 is repeated until the electronic spindle lock mode is exited either automatically or manually based on user input.

Figure 7:
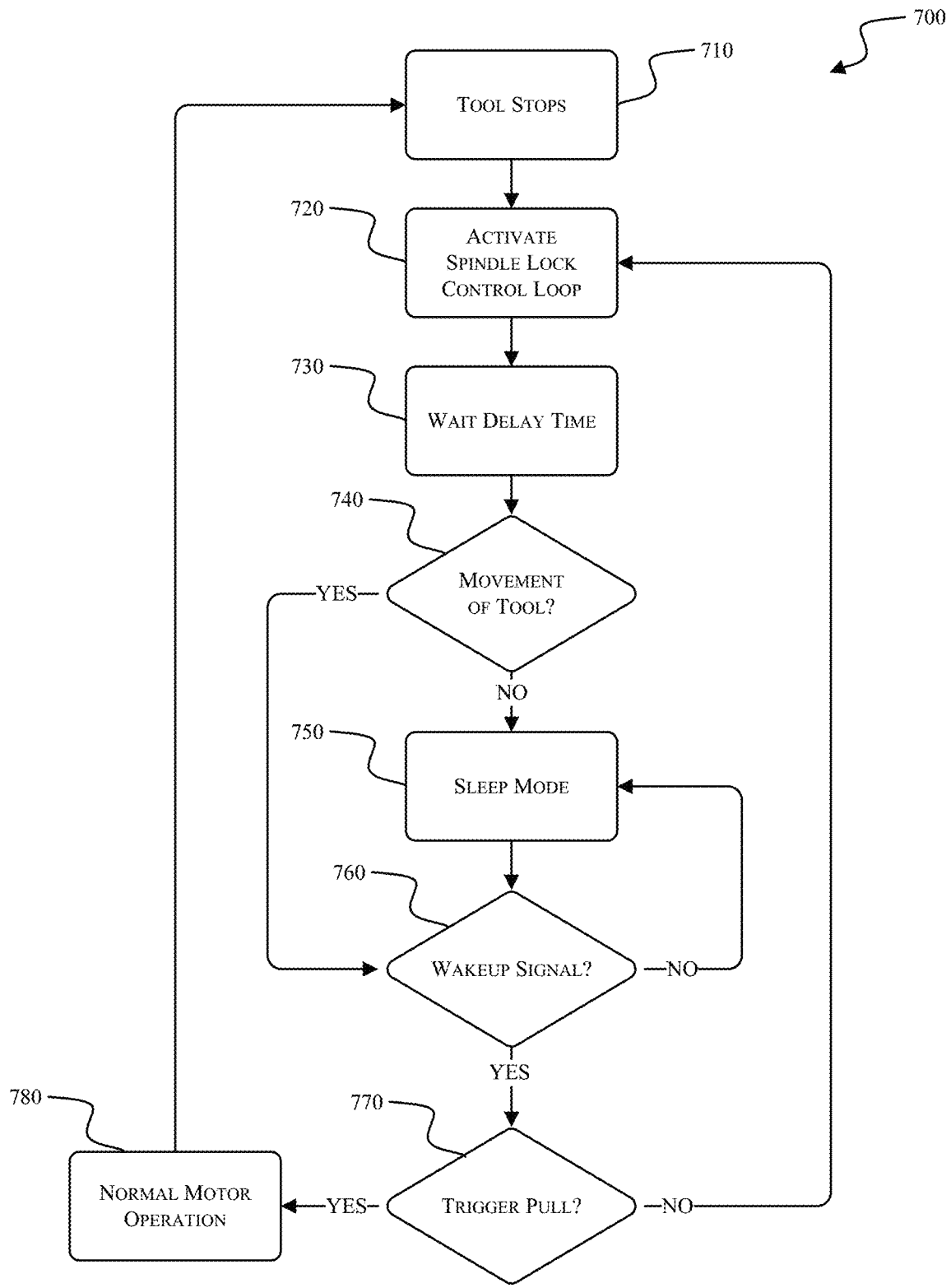
FIG. 7 is a flowchart of a method for operating an electronic spindle lock in accordance with some embodiments.

FIG. 7 is a flowchart of an example method 700 for operating an electronic spindle lock for the power tool 100, 200, 300. In the example illustrated, the method 700 includes determining, using the controller 500, that the power tool 100, 200, 300 is stopped (at block 710). The controller 500 may continuously monitor the trigger switch 515 to determine whether the trigger is being pulled. When the controller 500 does not receive a trigger signal from the trigger switch 515, the controller 500 determines that the power tool 100, 200, 300 is stopped. In some embodiments, the controller 500 determines that the power tool 100, 200, 300 is stopped based on a rotation position sensor of the motor 505. Specifically, the controller 500 determines that the power tool 100, 200, 300 is stopped based on determining that the motor 505 is stationary in addition to or in place of determining that the trigger 520 is not being pulled.

The method 700 also includes activating, using the controller 500, a spindle lock control loop (at block 720) in response to determining that the tool is stopped. As described above with respect to FIG. 6, the power tool 100, 200, 300 enters an electronic spindle lock mode when the tool is stopped. When in the spindle lock control loop, the controller 500 monitors for rotation of the bit receiving portion. The controller 500 may execute the spindle lock control loop to maintain the rotational position of the motor 505, as described below. In some embodiments, the controller 500 implements the spindle lock control loop in the blocks 610 and 620 of the method 600.

The method 700 includes waiting, using the controller 500, a delay time after activating the spindle lock control loop (at block 730). The controller 500 executes the spindle lock control loop prior to or while waiting the delay time. In some embodiments, the controller 500 starts a timer for the delay after the tool is stopped. In some embodiments, the delay time may be preprogrammed into the controller 500 during manufacturing. In some embodiments, the delay time may be customizable by a user using an application on a connected smart device (for example, a smart telephone, a tablet computer, a laptop computer, a wearable device, or the like).

The method 700 includes configuring, using the controller 500, sensors to detect movement of the power tool 100, 200, 300 (at block 740) after the delay time. For example, the power tool 100, 200, 300 includes an accelerometer to detect movement of the power tool 100, 200, 300. The accelerometer may be deactivated during normal operation. The controller 500 may activate or configure the accelerometer to detect movement of the power tool 100, 200, 300 after the delay timer expires. The method 700 includes entering, using the controller 500, a sleep mode (at block 750) after the delay time and if no movement of the tool 100, 200, 300 is detected. In the sleep mode, the controller 500 deactivates the spindle lock control loop to preserve battery. If movement of the tool 100, 200, 300 is detected at block 740, the method proceeds to block 760.

The method 700 includes determining, using the controller 500, whether a wake up signal is received (at block 760). The controller 500 may receive the wake up signal from the accelerometer, for example, when the accelerometer detects movement of the power tool 100, 200, 300. The controller 500 may also receive the wake up signal when the trigger 520 is pulled. The method 700 includes determining, using the controller 500, whether the wake up signal is received from the trigger (at block 770). When the wake up signal is received from the trigger 520, the method 700 includes performing, using the controller 500, normal motor operation (at block 780). Normal motor operation may include controlling the motor according to trigger pull and/or without performing motor control for spindle lock as described above. When the wake up signal is not received from the trigger 520, that is, when the wake up signal is received from the accelerometer or another sensor, the method 700 returns to block 720 to activate the spindle lock control loop.

Figure 8:
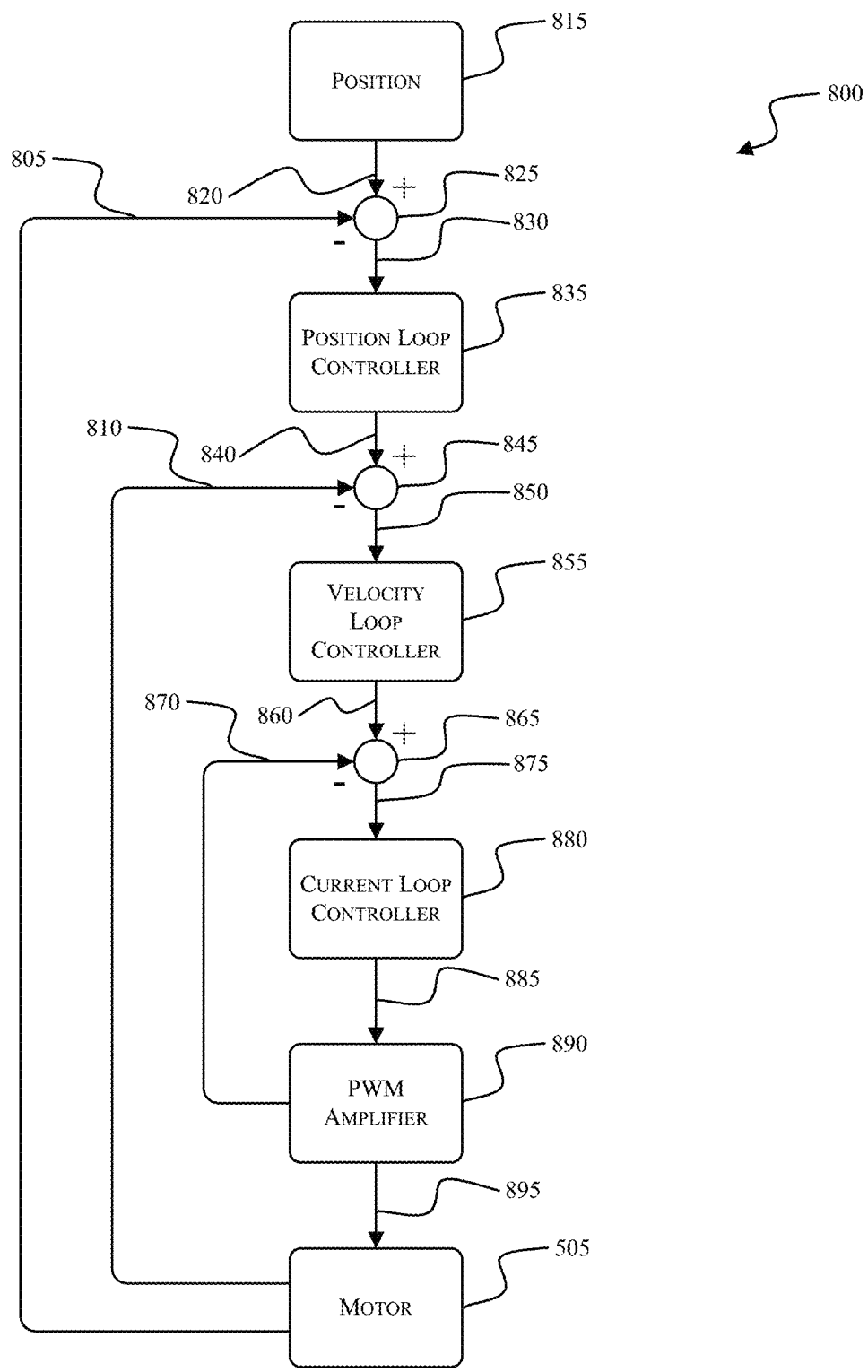
FIG. 8 illustrates a spindle lock control loop in accordance with some embodiments.

As discussed above, when the power tool 100, 200, 300 enters the electronic spindle lock mode (i.e., a locking mode), the power tool 100, 200, 300 behaves as if a conventional mechanical spindle lock was activated. The electronic spindle lock is activated in accordance with a spindle lock control loop. FIG. 8 illustrates an example spindle lock control loop 800. In the example illustrated, the spindle lock control loop 800 is a proportional-integral loop. The spindle lock control loop 800 uses a four-quadrant motor control to apply torque in the opposite direction of motion of the bit receiving portion to maintain the physical position of the motor 505. The spindle lock control loop 800 is executed by the controller 500.

The spindle lock control loop 800 is executed to provide control signals to the motor 505 for operation of the motor 505 in the electronic spindle lock mode. Feedback signals are received from the motor 505 and used for providing the control signals to operate the motor 505. The feedback signals include, for example, a position feedback signal 805 and a velocity feedback signal 810. In a sensored brushless motor, the position feedback signal 805 and the velocity feedback signal 810 are received based on readings from a sensor (e.g., a Hall-effect sensor) of the sensored brushless motor. For example, the Hall-effect sensors indicate a position of the rotor of the motor 505 to the controller 500. Based on the position signals, the controller 500 may determine the position and velocity of the rotor of the motor 505. In a sensorless brushless motor, the position feedback signal 805 and the velocity feedback signal 810 are received based on readings from a voltage sensor of the sensorless brushless motor. The voltage sensor detects the back-emf induced in one or more of the inactive windings and provides an indication of the back-emf to the controller 500. The controller 500 determines the position and the velocity of the rotor of the motor 505 based on the back-emf signals from the voltage sensor. The voltage sensor may detect the back-emf in either the main windings of the motor 505 or in secondary specialized windings of the motor 505. In some embodiments, the position and velocity may also be detected using external rotary encoders that detect the movement of the spindle or an output shaft.

The spindle lock control loop 800 includes a position block 815 that stores an expected position of the rotor. For example, the controller 500 may detect a position of the rotor when the tool is stopped and store detected position in the memory 560. The position block 815 retrieves and outputs the expected position information 820 stored in the memory 560. The spindle lock control loop 800 includes a first error estimator 825 that receives the expected position information 820 from the position block 815 and the position feedback signal 805. The first error estimator 825 outputs a position error signal 830 indicating a discrepancy between the expected position and the actual position of the rotor to a position loop controller 835. The position loop controller 835 outputs expected velocity information 840 based on the position error signal 830.

The spindle lock control loop 800 includes a second error estimator 845 that receives the expected velocity information 840 from the position loop controller 835 and the velocity feedback signal 810. The second error estimator 845 outputs a velocity error signal 850 indicating a discrepancy between the expected velocity and the actual velocity of the rotor to a velocity loop controller 855. The velocity loop controller 855 outputs expected current information 860 based on the velocity error signal 850.

The spindle lock control loop 800 includes a third error estimator 865 that receives the expected current information 860 from the velocity loop controller 855 and a current feedback signal 870. A current sensor may be provided by the motor 505 to detect an amount of current flowing to the motor 505 or the FET switching module 550. The current sensor is coupled to the controller 500 to provide the current information to the controller 500. The controller 500 determines the current flowing to the motor based on the current signals received from the current sensor. The third error estimator 865 outputs a current error signal 875 indicating a discrepancy between the expected current and the actual current flowing to the motor 505 to a current loop controller 880. The current loop controller 880 outputs PWM control signals 885 to a PWM amplifier 890.

The PWM amplifier 890 amplifies the PWM control signals 885 from the current loop controller 880 to output amplified PWM control signals 895. The amplified PWM control signals 895 are provided to the FET switching module 550 to control operation of the motor 505 to enforce the spindle lock as described above.

In some embodiments, the controller 500 enforces a maximum time limit on how long the motor 505 is controlled for the spindle lock to preserve battery. For example, in cases when the power tool 100, 200, 300 is in transit in a bag or in the back of a truck, the movement may cause the accelerometer to detect that the power tool 100, 200, 300 is picked up. In some instances, the movement may also result in the controller 500 detecting a torque being applied to the bit receiving portion. In these cases, the controller may apply torque to maintain rotational position for the maximum time limit, for example, for a maximum of 30 seconds. In other embodiments, the accelerometer may be a low-powered accelerometer that only detects soft power tool movements due to the user. In these embodiments, the maximum time limit may not be needed.

Figure 9:
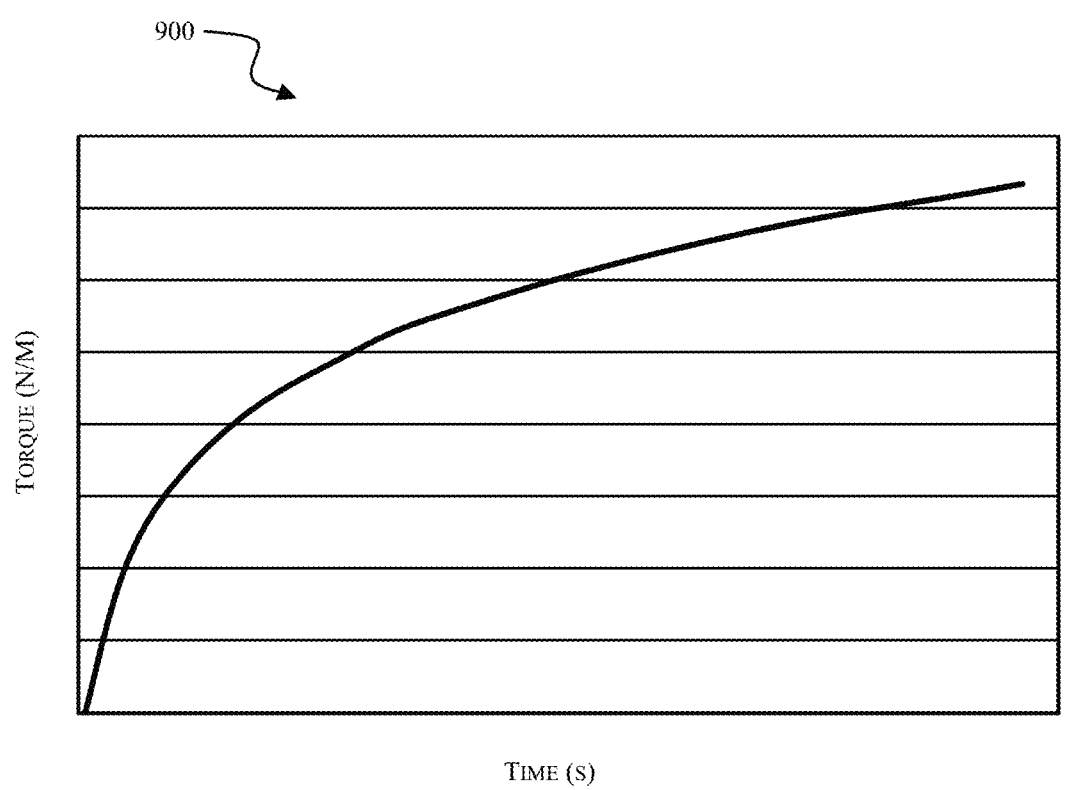
FIG. 9 illustrates a torque signature observed on the hand-held power tool of FIGS. 1-5 in accordance with some embodiments.
Figure 10:
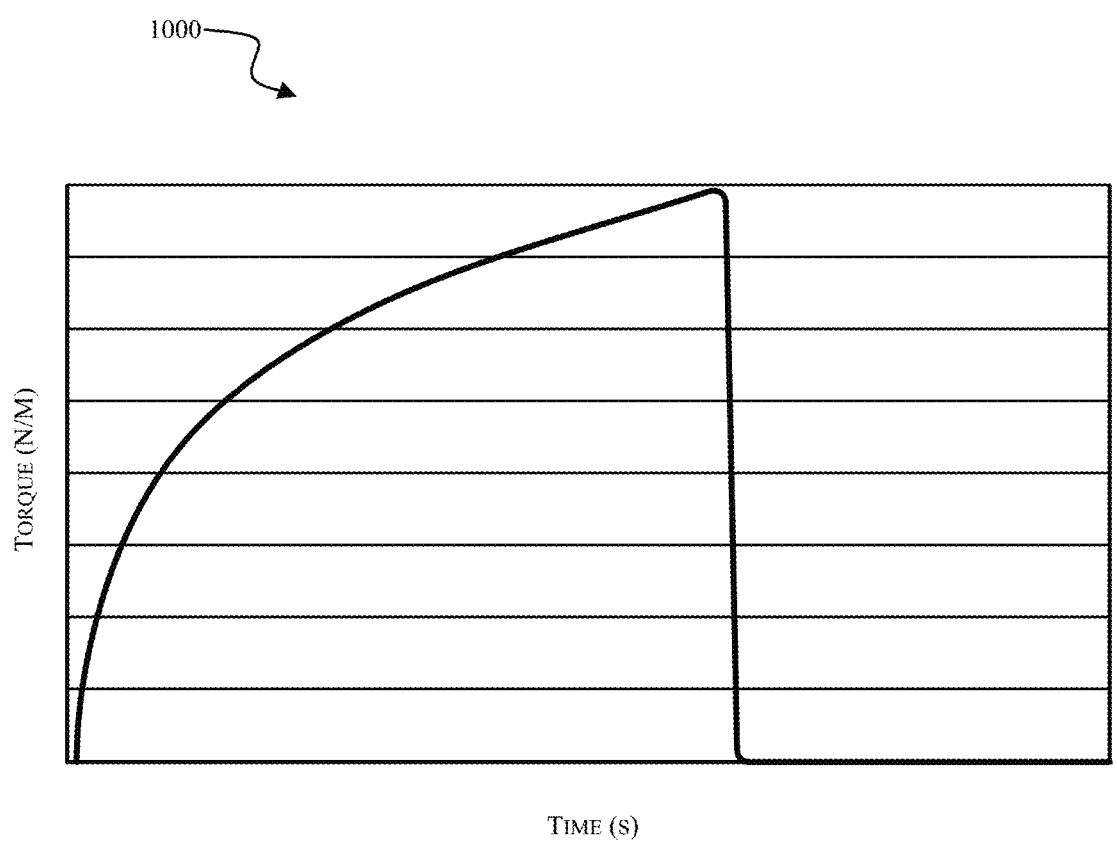
FIG. 10 illustrates a torque signature observed on the hand-held power tool of FIGS. 1-5 in accordance with some embodiments.
Figure 11:
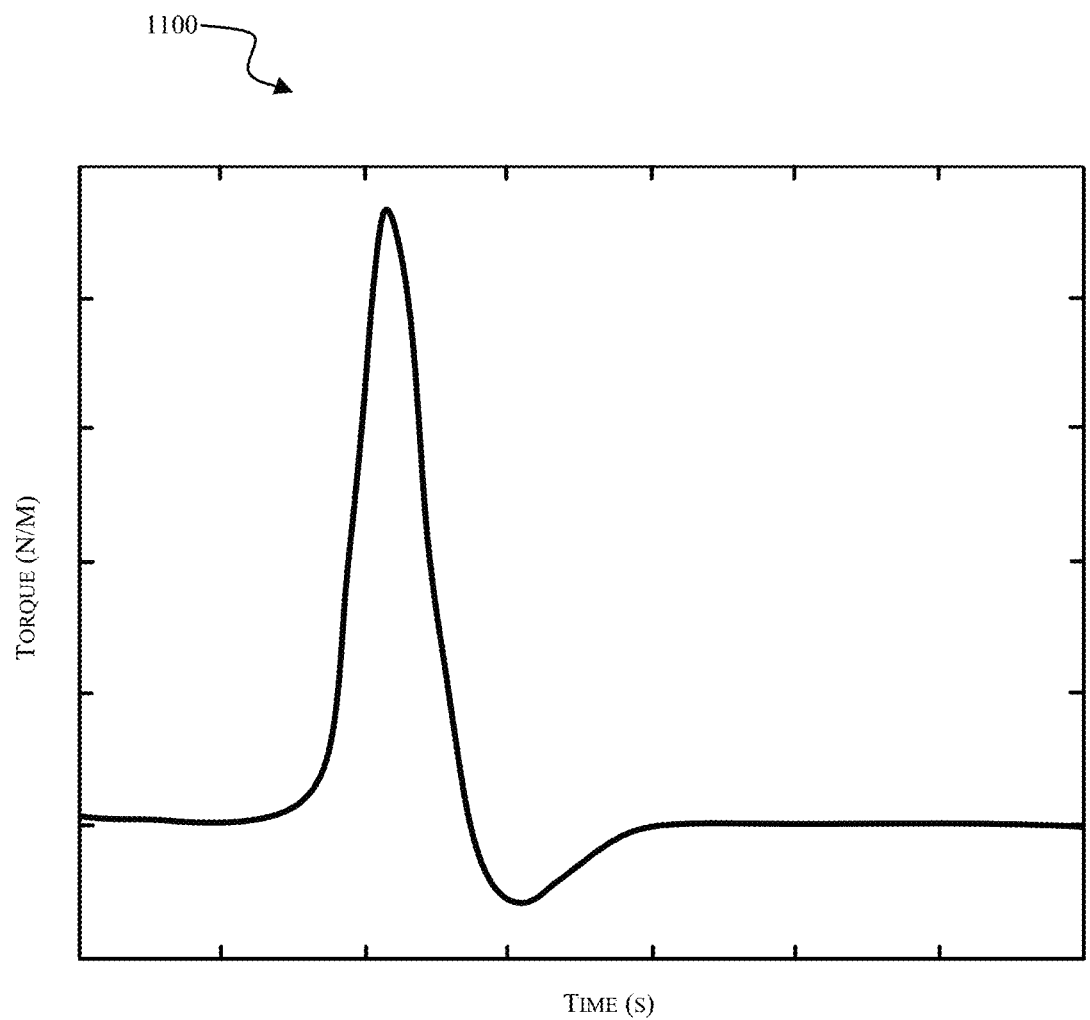
FIG. 11 illustrates a torque signature observed on the hand-held power tool of FIGS. 1-5 in accordance with some embodiments.

In some embodiments, the electronic spindle lock is disabled when multiple quick and short impulses are detected by the controller 500. FIG. 9 illustrates an example torque signature 900 detected when a user is applying torque to the bit receiving portion, but is unable to remove the tool bit. FIG. 10 illustrates an example torque signature 1000 detected when a user is applying torque to the bit receiving portion and is successful in removing the tool bit. However, a quick and short impulse 1100, as shown in FIG. 11, is detected when the power tool 100, 200, 300 is in transit, for example, in a bag or in a truck. When the controller 500 detects the quick and short impulse 1100, the controller 500 may disable the electronic spindle lock such that the rotor can rotate with the bit receiving portion (e.g., when the user is not gripping the power tool 100, 200, 300).

In some embodiments, rather than the accelerometer or in addition to the accelerometer, the power tool 100, 200, 300 may include a capacitive sensor or an inductive sensor in one of the handle or the bit receiving portion of the power tool 100, 200, 300. The capacitive sensor or inductive sensor detects when a user is gripping the handle or the bit receiving portion and provides a signal to the controller 500. In some embodiments, the controller 500 only enables the electronic spindle lock in response to detecting that the user is gripping the handle or the bit receiving portion.

In some embodiments, the bit receiving portion includes a gyroscope to monitor a user gripping and rotating the chuck to remove or replace a tool bit. The gyroscope readings may be used to both detect when to enter the electronic spindle lock mode and also to detect a rotation of the bit receiving portion in a first direction as described above. In some embodiments, the power tool 100, 200, 300 includes a barometric sensor for detecting when an orifice on the power tool 100, 200, 300 is covered. The readings from the barometric sensor may be used to detect when to enter the electronic spindle lock mode as described above. The barometric sensor is provided on, for example, the handle, the bit receiving portion, and/or another component of the power tool 100, 200, 300.

In some embodiments, a human-machine interface (HMI) element is used to detect a user gripping the bit receiving portion. For example, a push button may be used to enable a user to select the electronic spindle lock mode. In some embodiments, a light pipe is used to detect a user gripping the power tool 100, 200, 300. A photodetector may be used with light pipe to determine when to enter the electronic spindle lock mode as described above. The light pipe and the photodetector are provided in, for example, the handle, the bit receiving portion, and/or another component of the power tool 100, 200, 300. In some embodiments, a mechanical system is used to sense a back drive force caused by the user moving the bit receiving portion to enter the spindle lock mode.

In some embodiments, the electronic spindle lock is only enabled when the battery pack 400 is charged to above a low-voltage threshold. In other embodiments, the electronic spindle lock is enabled when the battery pack 400 is charged to below the low-voltage threshold, but above a deep-discharge threshold. In these embodiments, the electronic spindle lock is disabled when the battery pack 400 is charged to below the deep-discharge threshold.

In some embodiments, the electronic spindle lock may be implemented in other ways than described above. The below described embodiments may be implemented in addition to or in place of the active motor control embodiments described above. Specifically, the below described embodiments are applicable when the power tool 100, 200, 300 is not coupled to the battery pack 400 or when the power tool 100, 200, 300 is not powered by the battery pack 400. For example, the motor windings may be shorted to implement the electronic spindle lock. That is, the motor 505 is configured as a brake in response to entering the spindle lock mode. The motor windings may be shorted when the power tool 100, 200, 300 is not connected to the battery pack 400. As a consequence, when a torque is applied to the bit receiving portion, the motor offers sufficient resistance (i.e., counter torque) to prevent the rotor, and thereby the spindle, from rotating. Shorting the motor windings may be implemented by using depletion mode metal-oxide-semiconductor field effect transistors (MOSFETs). Depletion mode MOSFETs are normally closed such that the depletion mode MOSFETs remain closed when the battery pack 400 is disconnected from the power tool 100, 200, 300. The depletion mode MOSFETs may be connected in parallel to N-channel enhancement mode MOSFETs that are used on the low side of the FET switching module 550. When the battery pack 400 is disconnected from the power tool 100, 200, 300, the gate-to-source voltage, Vgs, of the depletion mode MOSFETs is zero. The depletion mode MOSFETs form a short across the motor 505 when closed and create a braking effect on the motor 505. When the battery pack 400 is connected, the depletion mode MOSFETs are opened, thereby allowing the motor to operate normally based on trigger pull. Accordingly, when the battery pack 400 is removed the electronic spindle lock is implemented by shorting the motor windings. When the battery pack 400 is connected the electronic spindle lock is implemented by the proportional-integral control loop described above.

In some embodiments, secondary windings with additional analog circuitry are added to the motor 505. The secondary windings quickly develop a voltage when the motor 505 is rotated (for example, due to rotation of the tool bit or spindle) and the battery pack 400 is disconnected from the power tool 100, 200, 300. The voltage on the secondary windings may be used to charge a capacitor of the analog circuit. When the capacitor is sufficiently charged, the capacitor may be used to close the low-side MOSFETs of the FET switching module 550. The closed low-side MOSFETs create a low-resistance loop across the motor 505 similar to the depletion mode MOSFETs. The low-resistance loop acts as a brake for the motor 505, thereby allowing the user to rotate the bit receiving portion without rotating the rotor. When the battery pack 400 is connected to the power tool 100, 200, 300, the controller 500 may disable the analog circuit preventing accidental shorting of the low-side MOSFETs during operation.

In some embodiments, a small battery (e.g., a coin cell battery) may be used to short the low-side MOSFETs when the battery pack 400 is disconnected from the power tool 100, 200, 300 and motor rotation is detected. The small battery may be a rechargeable battery that can be charged the next time the battery pack 400 is connected to the power tool 100, 200, 300.

Thus, embodiments described herein provide an electronic spindle lock for a power tool. Various features and advantages are set forth in the following claims.

What is claimed is:

1. A power tool comprising:
a housing;
a bit receiving portion provided on the housing;
a motor within the housing configured to rotate the bit receiving portion; and
a controller coupled to the motor, the controller configured to:

enter an electronic spindle lock mode for controlling the motor to engage or disengage the bit receiving portion with a tool bit, and activate a spindle lock control loop in response to entering the electronic spindle lock mode, the spindle lock control loop including:

detect a positional quantity of the motor in a first direction, determine that the positional quantity is different from an expected positional quantity of the motor, and control the motor to generate a torque in a second direction, the torque maintains a rotational position of the motor, in response to determining that the positional quantity is different from the expected positional quantity of the motor.

2. The power tool of claim 1, wherein the controller is further configured to:

determine that the power tool is stopped;

activate the spindle lock control loop in response to determining that the power tool is stopped;

detect, using one or more sensors, movement of the power tool a delay time after activating the spindle lock control loop; and enter a sleep mode when no movement of the power tool is detected after the delay time.

3. The power tool of claim 2, wherein determining the positional quantity is different from the expected positional quantity of the motor, the controller is further configured to:

determine an expected rotor position of a rotor of the motor, wherein the positional quantity includes an actual position of the rotor, determine a position error for the motor based on a difference between the expected position of the rotor and the actual position of the rotor, determine an actual velocity of the rotor of the motor, determine an expected velocity of the rotor of the motor, and determine a velocity error for the motor based on a difference between the expected velocity of the rotor and the actual velocity of the rotor.

4. The power tool of claim 2, wherein the controller is further configured to:

determine that a wake-up signal is received when in the sleep mode;

perform normal motor operation when the wake-up signal is received from a trigger; and activate the spindle lock control loop when the wake-up signal is received from the one or more sensors, wherein normal motor operation includes controlling the motor according to trigger pull of the trigger.

5. The power tool of claim 3 wherein the controller is further configured to:

determine an expected current of the motor based on the difference between the expected velocity of the rotor and the actual velocity of the rotor, determine an amount of actual current of the motor, and determine a current error for the motor based on a difference between the expected current of the motor and the amount of actual current of the motor.

6. The power tool of claim 5, wherein controlling the motor to rotate in the second direction in response to determining that the positional quantity is different from the expected positional quantity of the motor, the controller is further configured to:

generate a pulse-width modulated (PWM) signal based on the current error for the motor, and control rotation of the motor based on the PWM signal.

7. The power tool of claim 1, further comprising an electronic spindle lock button, wherein the controller is further configured to:

enter the electronic spindle lock mode when the electronic spindle lock button is actuated.

8. The power tool of claim 1, wherein the controller is further configured to enforce a maximum time limit for the electronic spindle lock mode such that the spindle lock control loop is deactivated after the maximum time limit.

9. A method for operating an electronic spindle lock of a power tool including a motor configured to rotate a bit receiving portion, the method comprising:

entering, using a controller of the power tool, an electronic spindle lock mode for controlling the motor to engage or disengage the bit receiving portion with a tool bit; and activating, using the controller, a spindle lock control loop in response to entering the electronic spindle lock mode, the spindle lock control loop including:

detect a positional quantity of the motor in a first direction, determining that the positional quantity is different from an expected positional quantity of the motor, and controlling the motor to generate a torque in a second direction, the torque maintains a rotational position of the motor, in response to determining that the positional quantity is different from the expected positional quantity of the motor.

10. The method of claim 9, further comprising:

determining that the power tool is stopped;

activating the spindle lock control loop in response to determining that the power tool is stopped;

detecting, using one or more sensors, movement of the power tool a delay time after activating the spindle lock control loop; and entering a sleep mode when no movement of the power tool is detected after the delay time.

11. The method of claim 10, further comprising:

determining that a wake-up signal is received when in the sleep mode;

performing normal motor operation when the wake-up signal is received from a trigger; and activating the spindle lock control loop when the wake-up signal is received from the one or more sensors, wherein normal motor operation includes controlling the motor according to trigger pull of the trigger.

12. The method of claim 10, wherein determining the positional quantity is different from the expected positional quantity of the motor, further comprises:

determining an expected rotor position of a rotor of the motor, wherein the positional quantity includes an actual position of the rotor, determining a position error for the motor based on a difference between the expected position of the rotor and the actual position of the rotor, determine an actual velocity of the rotor of the motor, determining an expected velocity of the rotor of the motor, and determining a velocity error for the motor based on a difference between the expected velocity of the rotor and the actual velocity of the rotor.

13. The method of claim 12, further comprising:
  determining an expected current of the motor based on the difference between the expected velocity of the rotor and the actual velocity of the rotor,
  determining an amount of actual current of the motor, and
  determining a current error for the motor based on a difference between the expected current of the motor and the amount of actual current of the motor.

14. The method of claim 13, wherein controlling the motor to rotate in the second direction in response to determining that the positional quantity is different from the expected positional quantity of the motor, further comprises:
  generating a pulse-width modulated (PWM) signal based on the current error for the motor, and
  controlling, with rotation of the motor based on the PWM signal.

15. A power tool comprising:
  a housing;
  a bit receiving portion provided on the housing;
  a motor within the housing configured to rotate the bit receiving portion;
  a sensor configured to detect a positional quantity of the motor in a first direction; and
  a controller coupled to the motor, the controller configured to:
    enter an electronic spindle lock mode for controlling the motor to engage or disengage the bit receiving portion with a tool bit, and
    control the motor as a brake in response to entering the spindle lock mode,
  wherein the motor generates a counter torque that maintains a rotational position of the motor in response to determining a difference between an expected positional quantity of the motor and the positional quantity of the motor in the first direction.

16. The power tool of claim 15, further comprising a trigger, wherein the controller is further configured to:
  enter the electronic spindle lock mode when the trigger is released for stopping operation of the power tool, wherein the electronic spindle lock mode inhibits movement of a drive train when the bit receiving portion is rotated.

17. The power tool of claim 15, further comprising a metal-oxide-semiconductor field effect transistor (MOSFET) connected between motor windings of the motor.

18. The power tool of claim 17, further comprising a battery pack providing operating power to the motor,
  wherein the MOSFET is a depletion mode MOSFET,
  wherein the depletion mode MOSFET is normally closed when the battery pack is removed, and
  wherein the controller is further configured to open the depletion mode MOSFET when the battery pack is connected to the power tool.

19. The power tool of claim 15, further comprising:
  a battery pack providing operating power to the motor,
  wherein the motor further includes secondary windings configured to develop a voltage when the bit receiving portion is rotated relative to the housing and the battery pack is disconnected from the power tool.

20. The power tool of claim 19, wherein the voltage on the secondary windings is used to charge a capacitor, and wherein when the capacitor is sufficiently charged, the capacitor is used to short motor windings of the motor.

* * * * *